United States Patent [19]

Smith

[11] Patent Number: 4,478,158
[45] Date of Patent: Oct. 23, 1984

[54] CONDENSING FURNACES

[75] Inventor: Robert W. Smith, Ontario, Canada

[73] Assignee: Eneroil Research Ltd., Downsview, Canada

[21] Appl. No.: 490,221

[22] Filed: Apr. 29, 1983

[30] Foreign Application Priority Data

Oct. 28, 1982 [GB] United Kingdom ............... 8230760

[51] Int. Cl.³ .............................................. F23J 15/00
[52] U.S. Cl. .................................. 110/215; 110/343; 126/99 A; 126/109
[58] Field of Search ............... 110/215, 342, 343, 344, 110/345; 126/99 R, 110 R, 110 AA, 117, 109, 99 A, 113; 165/179

[56] References Cited

U.S. PATENT DOCUMENTS

| | | | |
|---|---|---|---|
| 2,218,281 | 10/1940 | Ridder | 110/343 |
| 2,297,666 | 9/1942 | Wachter | 110/343 |
| 3,601,070 | 8/1971 | Lambiris | 110/215 |
| 3,604,375 | 9/1971 | Bruns | 110/215 |
| 3,615,165 | 10/1971 | Clement | 110/215 |
| 3,716,339 | 2/1973 | Shigaki | 110/215 |
| 3,745,939 | 7/1973 | Allbritton | 110/215 |
| 4,168,291 | 9/1979 | Libutti | 110/343 |
| 4,224,180 | 9/1980 | Sujdak | 110/343 |
| 4,272,496 | 6/1981 | Powell | 110/343 |
| 4,396,434 | 8/1983 | Forster | 110/343 |

*Primary Examiner*—Daniel J. O'Connor
*Attorney, Agent, or Firm*—Sim & McBurney

[57] ABSTRACT

An improvement in a condensing furnace where gaseous products of combustion are ducted through fin tube condensers that act to heat incoming air. The improvement involves spraying water into the products of combustion upstream of the fin tube condenser, so that the sprayed water droplets mix intimately with the products of combustion and are thus vaporized. In this manner, the combined water vapor and gaseous combustion products can condense in the fin tube condenser to create a liquid condensate of which the pH is closer to neutral than would have been the case in the absence of the sprayed water.

5 Claims, 3 Drawing Figures

CONDENSING FURNACES

This invention relates generally to condensing furnaces, and has to do particularly with an improvement for condensing furnaces which allows a minimization of the damage done particularly to the condensing portions of the furnace by the acid condensate from the products of combustion.

BACKGROUND OF THIS INVENTION

The known construction of condensing furnaces is one which typically requires the combustion gases to be passed first through a heat exchanger and then through a fin tube condenser which acts as a heat exchanger between the hot gases resulting from combustion and the air being drawn into the furnace at the suction of the air blower. Normally, the fin tubes are either vertical or sloped downwardly in the direction of the gas travel, so that liquid condensate may collect at the bottom in a manifold or the like, from where the condensate may be tapped off and discarded.

Typically, a condensing furnace which utilizes natural gas as fuel will produce a liquid condensate having a pH in the region of 3.8 to 4.8. By using a good grade of stainless steel for the portions contacted by this acidic condensate, damage can be kept to a minimum. However, when a condensing furnace burns oil, the condensate resulting from the hot products of combustion tends to be more acidic, having a pH in the range of 2.4. At this level of acidity, the condensate tends to attack even good grades of stainless steel, and particularly the weld locations between the tubes and the manifolds at either end.

GENERAL DESCRIPTION OF THIS INVENTION

In view of the foregoing problems relating to acidic condensate, it is an aspect of this invention to provide an improvement which will have the effect of reducing the acidity of the condensate by raising its pH.

More particularly, this aim is accomplished by mixing with the hot gases resulting from combustion, at a location just upstream of the fin tube condenser unit, an amount of water sufficient to dilute the condensate and thus raise its pH.

Even more particularly, by spraying water under pressure into the upstream manifold of the condenser, with the gaseous products of combustion contacting the spray at elevated temperatures in the region of about 400° F., the spray is vapourized and mixes fully with the cumbustion gases, so that the pH of the condensate will be substantially uniform.

By thus raising the pH of the condensate, it is not necessary to provide special neutralizing steps for the condensate which is tapped from the collection manifold at the downstream end of the condenser.

Accordingly, this invention provides an improvement in a condensing furnace in which gaseous products of combustion are ducted through fin tube condensing means which also constitutes a heater for incoming air to be heated. The improvement involves means for spraying water into the products of combustion upstream of the fin tube condensing means, so that the sprayed water droplets mix intimately with the products of combustion and are vapourized thereby. In this manner, the combined water vapour and gaseous combustion products can condense in the condensing means to create a liquid condensate of which the pH is closer to neutral than would have been the case in the absence of the sprayed water.

This invention also provides a method of protecting from acidic attack parts of a condensing furnace in which gaseous products of combustion are ducted through fin tube condensing means which also constitute a heater for incoming air to be heated. The method involves spraying water into the products of combustion upstream of the fin tube condensing means in such a way that the sprayed water droplets mix intimately with the products of combustion and are vapourized thereby. The combined water vapour and gaseous combustion products are then passed into the condensing means and are there condensed to create a liquid condensate of which the pH is closer to neutral than would have been the case in the absence of the sprayed water.

GENERAL DESCRIPTION OF THE DRAWINGS

One embodiment of this invention is illustrated in the accompanying drawings, in which like numerals denote like parts in the several views, and in which.

DETAILED DESCRIPTION OF THE DRAWINGS

Figure 1:
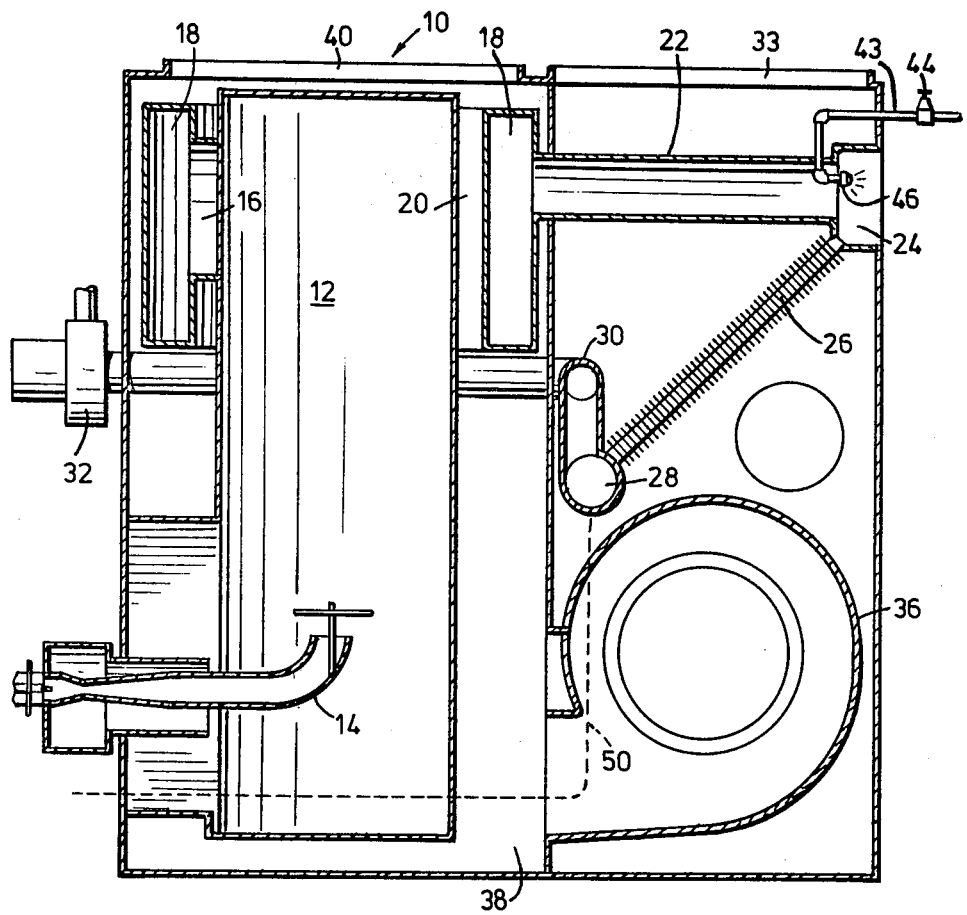
FIG. 1 is a cross section of one version of a condensing furnace to which this invention has been applied.

Attention is first directed to FIG. 1, which shows a condensing furnace 10 which includes a combustion chamber 12, in the lower end of which is mounted a typical gas burner 14. The upper end of the combustion chamber 12 communicates through a passageway 16 with an annular heat exchanger 18 which surrounds the combustion chamber 12 in spaced relation thereto, i.e. leaving an annular space 20 between these two portions. From the heat exchanger 18 a conduit 22 leads the gaseous products of combustion to a manifold 24 from which a plurality of fin tubes 26 extends downwardly and leftwardly to a collection manifold 28. From the collection manifold 28 a flue pipe 30 extends around the combustion chamber 12 to a draft inducing blower 32. This completes the pathway for the combustion gases. The air to be heated is drawn in at an upper opening 33, passes downwardly through the condensing fin tubes 26 (which thus act as a heat exchanger), and enters the air blower 36 axially in the usual manner. The air is then blown into a chamber 38 which annularly surrounds the combustion chamber 12, the chamber 38 also containing the heat exchanger 18. The air, heated by contact with the walls of the combustion chamber 12 and the walls of the heat exchanger 18, then passes out through the exit opening 40 at the top of the lefthand portion of the furnace.

The improvement which this invention provides is shown in the upper lefthand corner of the FIG. 1 drawing, and includes a pipe 43 for pressurized water, the pipe 43 coming from a suitable source of pressurized water, which may be a domestic water supply. The pipe 43 includes a pressure regulator 44, and terminates in a spray head 46 which is adapted to produce a finely divided spray in the manifold 24. The flue gases passing along the conduit 22 are relatively hot, and would be in the neighbourhood of 400° F., so that upon contact between the hot flue gases and the finely divided spray from the spray head 46, the spray would be vapourized.

The vapourized spray would then mix intimately with the hot combustion gases, and the mixture would pass into the plurality of fin tubes 26, and there condense.

By suitably adjusting the flow rate of water at the spray head 46, the condensate in the fin tubes 26 can be diluted, and the pH can be raised.

A typical flow quantity might be in the neighbourhood of two thirds of a gallon per hour at the spray head 46, for a furnace operating at a combustion rate that produces about one third of a gallon per hour of condensate from the combustion gases alone. Thus, the ratio of water added to liquid condensate from the gases alone is about 2:1.

The major part of the temperature drop from the gases in the conduit 22 to the ambience occurs in the fin tubes 26, due to the fact that the fin tubes are functioning as heat exchangers. Also, as is well known, the fact that certain constituents of the combustion gases condense in the fin tubes 26 causes them to give up the latent heat of condensation, thus adding to the heating effect for the air being drawn in through the opening 33 by the suction of the air blower 36.

The dotted line 50 shows the general path of a condensate tap line for removing condensate from the manifold 28. It is to be understood that the condensate tap line 50 would pass to the outside of the blower 36 and would not interfere with the various heating and combustion chambers.

It is well known that baffles or perforated plates are normally provided in one or both of the manifolds 24 and 28 in order to ensure an even distribution of gas flow through the different fin tubes 26. These baffles have not been illustrated in the figures, as they are conventionally known.

Figure 3:
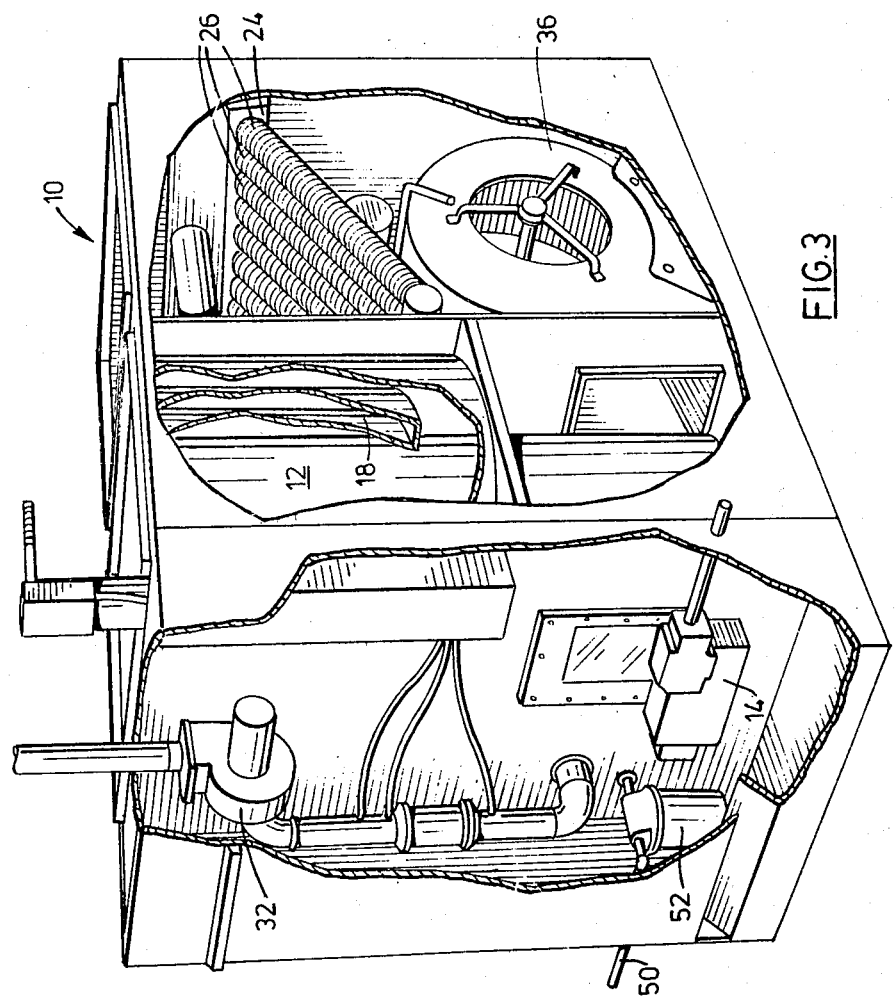
FIG. 3 is a partly broken-away perspective view of the embodiment of FIG. 1.

FIG. 3 shows the furnace of FIG. 1 in perspective, broken-away view, and includes a condensate neutralizer 52 on the tap line 50. It is contemplated that the neutralizer 52 could be omitted provided the flow rate of water through the spray head 46 was sufficiently high to cause the pH of the condensate to approach neutral.

Figure 2:
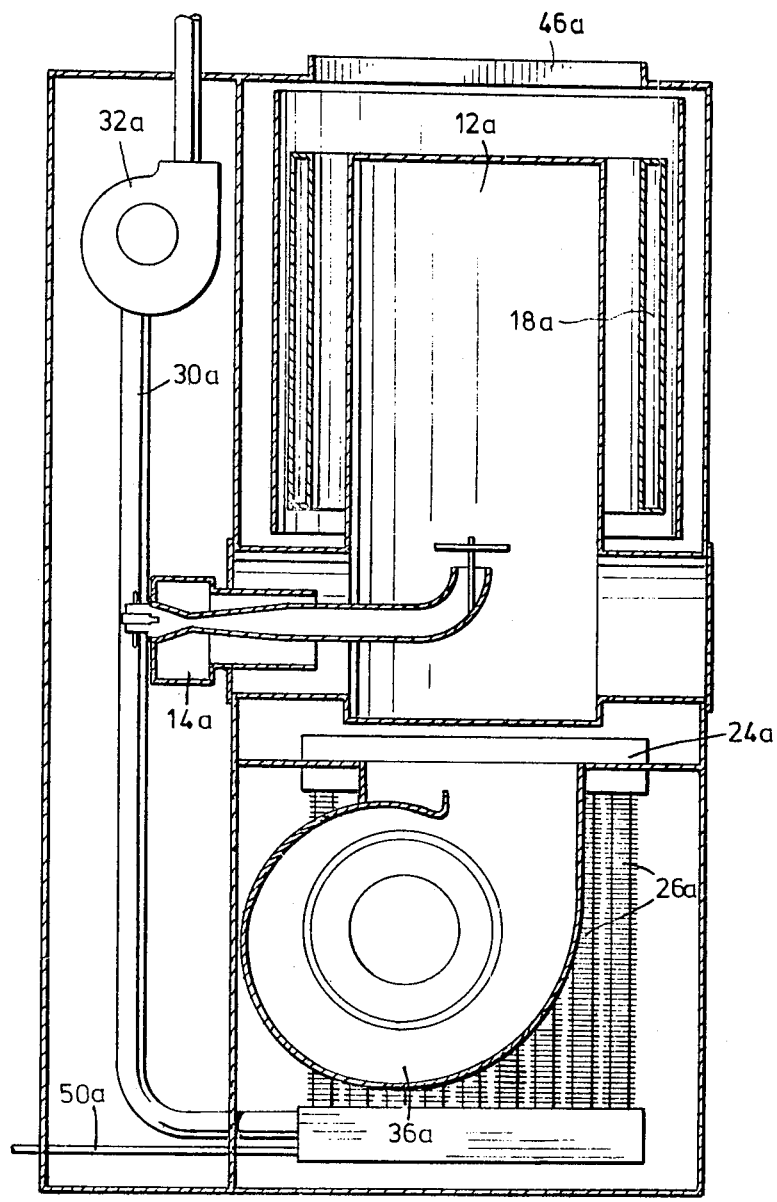
FIG. 2 is a cross section of another version of a condensing furnace to which this invention has been applied.

Attention is now directed to FIG. 2, which simply shows a vertical version of the same furnace. In the FIG. 2 embodiment, the fin tubes 26a are vertical, rather than sloping, and the air entry is at the bottom and furthest from the viewer. The fin tubes 26a are located between the air entry and the air blower 36a. In FIG. 2, the equivalent of conduit 22 between the heat exchanger 18a and the upper manifold 24a has not been illustrated, as it is not cut by the section of FIG. 2. Also, the water pipe and spray head in the manifold 24a are not illustrated in FIG. 2, since the manifold 24a is seen in full elevation, rather than in section. However, it is to be understood that a very similar installation would be present in the embodiment of FIG. 2, in which a spray head were situated to provide finely atomized water sprayed under pressure within the manifold 24a, so that impact upon the small droplets by the hot combustion gases would cause vapourization prior to condensation in the fin tubes 26a.

While two embodiments of this invention have been described hereinabove and illustrated in the attached drawings, it will be apparent to those skilled in the art that modifications may be made therein without departing from the essence of this invention, as set forth in the appended claims

I claim:

1. A condensing furnace, comprising:
    a burner means for producing hot gaseous products of combustion,
    blower means for moving air through the furnace,
    heat exchanger means for transferring heat from said hot gaseous products of combustion to said air,
    fin tube condensing means through which the hot gaseous products of combustion are ducted, and past which said air flows,
    and means for spraying water into the hot gaseous products of combustion upstream of the fin tube condensing means, so that the sprayed water droplets mix intimately with the hot gaseous products of combustion and are vaporized thereby, whereby a portion of the combined water vapor and gaseous products of combustion can condense in the condensing means to create a liquid condensate of which the pH is closer to neutral than would have been the case in the absence of the sprayed water.

2. The invention claimed in claim 1, further comprising an induced draft blower for withdrawing gaseous materials from said downstream manifold.

3. The invention claimed in claim 1, in which the upstream ends of the finned tube members are higher than the downstream ends thereof.

4. The invention claimed in claim 1, in which the fin tube condensing means includes a plurality of finned tube members extending downwardly from an upstream manifold to a downstream manifold, and in which the water is sprayed into the space within the upstream manifold.

5. The invention claimed in claim 1, in which the means for spraying water includes at least one spray head and water conduit means adapted to provide water under pressure to said spray head.

* * * * *